United States Patent [19]
Yokoyama

[11] Patent Number: 5,901,833
[45] Date of Patent: May 11, 1999

[54] GOLF BALL CONVEYOR

[76] Inventor: Yoshio Yokoyama, 10-1-102 Maeno-cho 6-chome, Itabashi-ku, Tokyo, Japan

[21] Appl. No.: 08/834,046

[22] Filed: Apr. 11, 1997

[51] Int. Cl.$^6$ .................................................. B65G 19/00
[52] U.S. Cl. .......................... 198/725; 198/728; 473/166
[58] Field of Search ................................. 198/717, 720, 198/721, 725, 727, 728, 729, 730, 733, 735.1, 735.5; 473/163, 166, 177, 182, 191; 273/122 R, 125 R

[56] References Cited

U.S. PATENT DOCUMENTS

| | | | |
|---|---|---|---|
| 3,294,215 | 12/1966 | Walter | 198/730 X |
| 3,706,452 | 12/1972 | Soucie | 473/166 |
| 3,797,827 | 3/1974 | Child | 273/35 R |
| 5,069,327 | 12/1991 | Stohr et al. | 198/725 |
| 5,350,055 | 9/1994 | Lecrone | 198/735.1 X |
| 5,513,841 | 5/1996 | Takagi | 473/166 X |

Primary Examiner—James R. Bidwell
Attorney, Agent, or Firm—Armstrong, Westerman, Hattori, McLeland & Naughton

[57] ABSTRACT

A golf ball conveyor including an endless chain having link pins arranged vertically which moves along a travelling line in a golf-ball conveying direction to convey golf balls. A driving device rotates the chain in an endless manner. A plurality of ball moving protrusions are provided at predetermined distances on the chain to move the golf balls one-by-one, and a plurality of guide rollers are provided at predetermined distances on the chain for guiding movement of the chain. Sprockets may be used for bending the travelling line of the endless chain.

8 Claims, 14 Drawing Sheets

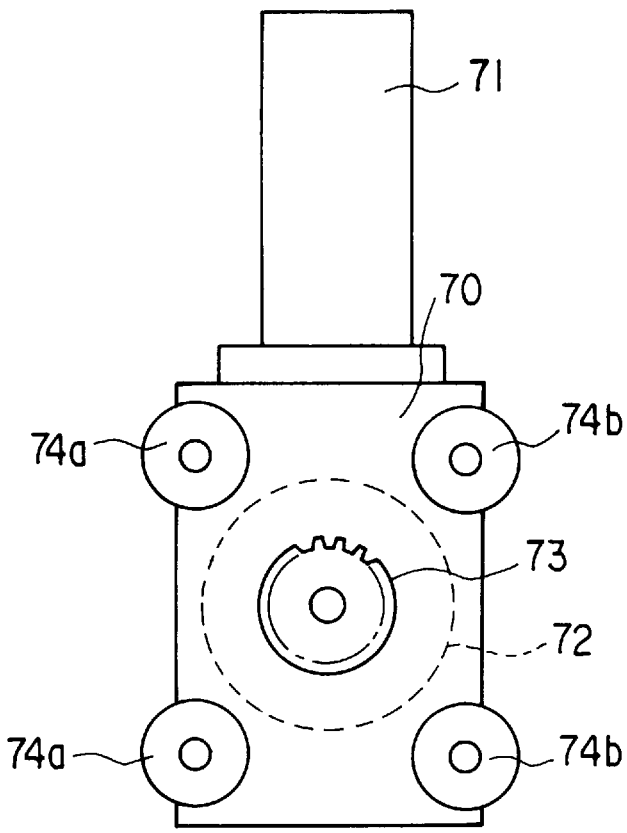
F I G . 17
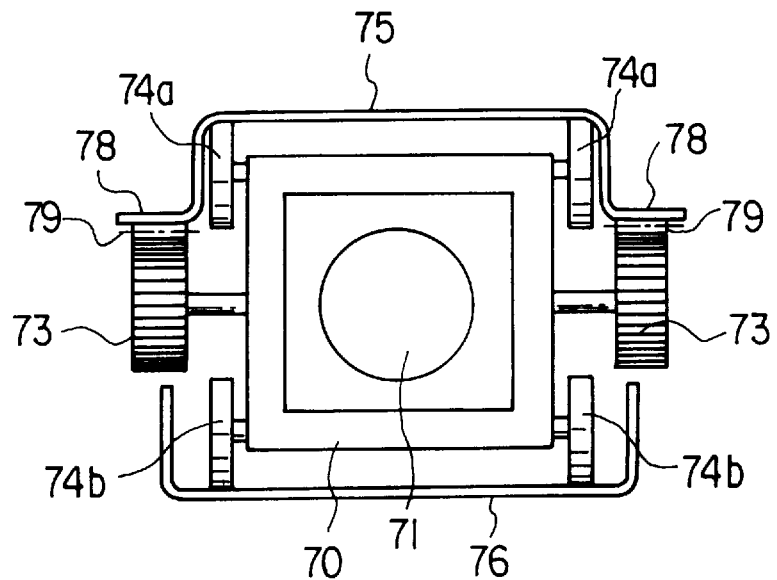
F I G . 18

GOLF BALL CONVEYOR

BACKGROUND OF THE INVENTION

1. Field of the Invention

The present invention relates to a golf practice machine set in a golf practice range or the like, and particularly to a golf ball conveyor for use in such a golf practice machine.

2. Description of the Related Art

In a golf practice range, golf balls hit from respective hitting boxes and scattered on a green are collected, cleaned, conveyed to the respective hitting sides, and received in ball tanks installed in front of automatic tee-up machines in the boxes.

A belt conveyor is usually used as a golf ball conveyer which is set on a golf ball conveying line.

However, in such a golf ball conveyer constituted by a belt conveyor, an endless belt is disposed vertically, so that the height of the golf ball conveyer becomes large as a whole, and particularly when the golf ball conveyer is buried in a floor not lower than a second concrete floor, the concrete floor becomes inevitably thicker.

In addition, the driving of the belt or the collision of golf balls with each other causes much noise. Further, since the belt conveyor extends in a straight line, when the golf ball conveying line is bent, a plurality of short belt conveyors are combined with each other, and a golf ball conveyed from one belt conveyor is dropped onto the next belt conveyor to thereby deliver the golf ball between belt conveyors. Therefore, there is a disadvantage such that a plurality of belt conveyors must be provided, and the golf ball conveyer becomes higher in height.

There is a device for conveying golf balls by using, not a belt conveyor, but a screw. In the case of use a screw, the screw also extends in a straight line, so that it is necessary to combine a plurality of screws when the conveying line is bent, and it is difficult to deliver golf balls between the screws to, thereby causing a problem in conveying the golf balls.

In addition, because the screw contacts with golf balls directly, it is impossible to feed lubricating oil to the screw, so that there is a defect that the service life of the screw is short.

SUMMARY OF THE INVENTION

It is therefore an object of the present invention to solve the foregoing problems.

It is another object of the invention to provide a golf ball conveyor which has a reduced thickness and a long service life.

In order to attain the foregoing objects, according to a first aspect of the present invention, a golf ball conveyor comprises: an endless chain which moves along a travelling line in a golf-ball conveying direction to convey golf balls; means for driving the chain to rotate in an endless manner; a plurality of ball moving protrusions provided at predetermined distances on the chain to move the golf balls one-by-one; and a plurality of guide rollers provided at predetermined distances on the chain for guiding the movement of the chain.

In such a golf ball conveyer according to the first aspect of the present invention, by use of the chain, the golf ball conveyer can be made thinner than that using a belt conveyor as in the prior art, so that it is possible to reduce the thickness of a concrete floor where the golf ball conveyor is buried, particularly when the floor is not lower than a second floor.

In the above golf ball conveyor according to the first aspect of the present invention, preferably, sprockets are provided so as to bend the travelling line of the endless chain.

By use of such sprockets, it is possible to bend and curve the chain freely, so that there is allowance in the design, and golf balls can be conveyed on the single chain even if the ball conveying line is bent and curved. Thus, the golf balls can be conveyed surely, and the reliability can be improved.

In the above golf ball conveyor according to the first aspect of the present invention, preferably, the ball moving protrusions are supported on the chain so as to separate from the chain.

Because the ball moving protrusions are separated from the chain, it is possible to feed lubricating oil to the chain so that the service life of the golf ball conveyor can be prolonged.

According to a second aspect of the present invention, a golf ball conveyor comprises: a casing having two side walls, a bottom wall, and a cap which removably closes a top opening of the casing, the casing extending along a travelling line in a golf-ball conveying direction; an endless chain movably disposed in the casing for conveying golf balls, the chain having rollers rotatably provided at predetermined distances on the chain to guide the chain and protrusions provided at predetermined distances on the chain to move the golf balls one-by-one; and gutters provided on inner surfaces of the side walls respectively, for collecting rainwater running down along inner surfaces of the side walls of the casing, and draining the rainwater outside the casing.

In such a golf ball conveyer according to the second aspect of the present invention, by the provision of the drain gutters in the inner surfaces of side walls of the casing, there is no fear that rainwater is collected in the casing so that the chain is prevented from getting rusty. As a result, golf balls are always conveyed smoothly by the chain, so that there is produced no noise to thereby keep silence, and the life of the golf ball conveyor can be prolonged.

BRIEF DESCRIPTION OF THE DRAWINGS

FIG. 17 is a side view of a lift member in an automatic tee-up unit according to an embodiment of the present invention;

FIG. 18 is a top view of the automatic tee-up unit;

DETAILED DESCRIPTION OF THE PREFERRED EMBODIMENT

Figure 1:
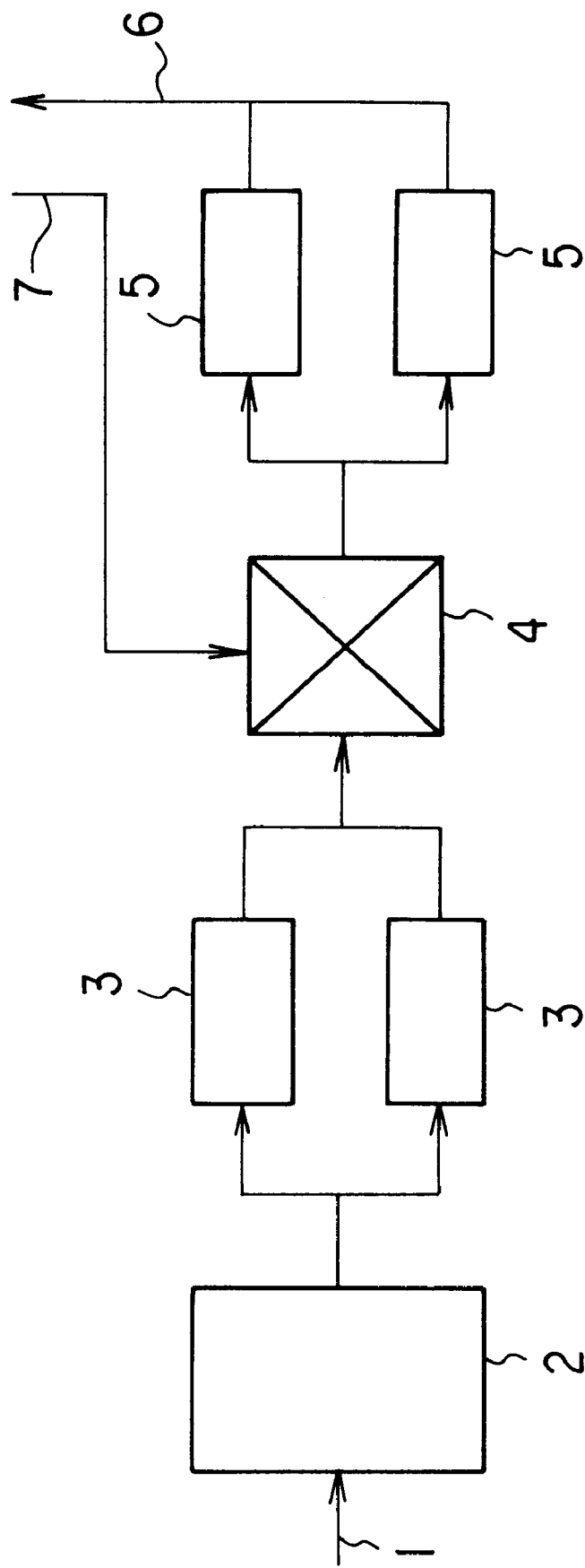
FIG. 1 is a system diagram illustrating the flow of collection and delivery of golf balls in a golf practice machine.
Figure 2:
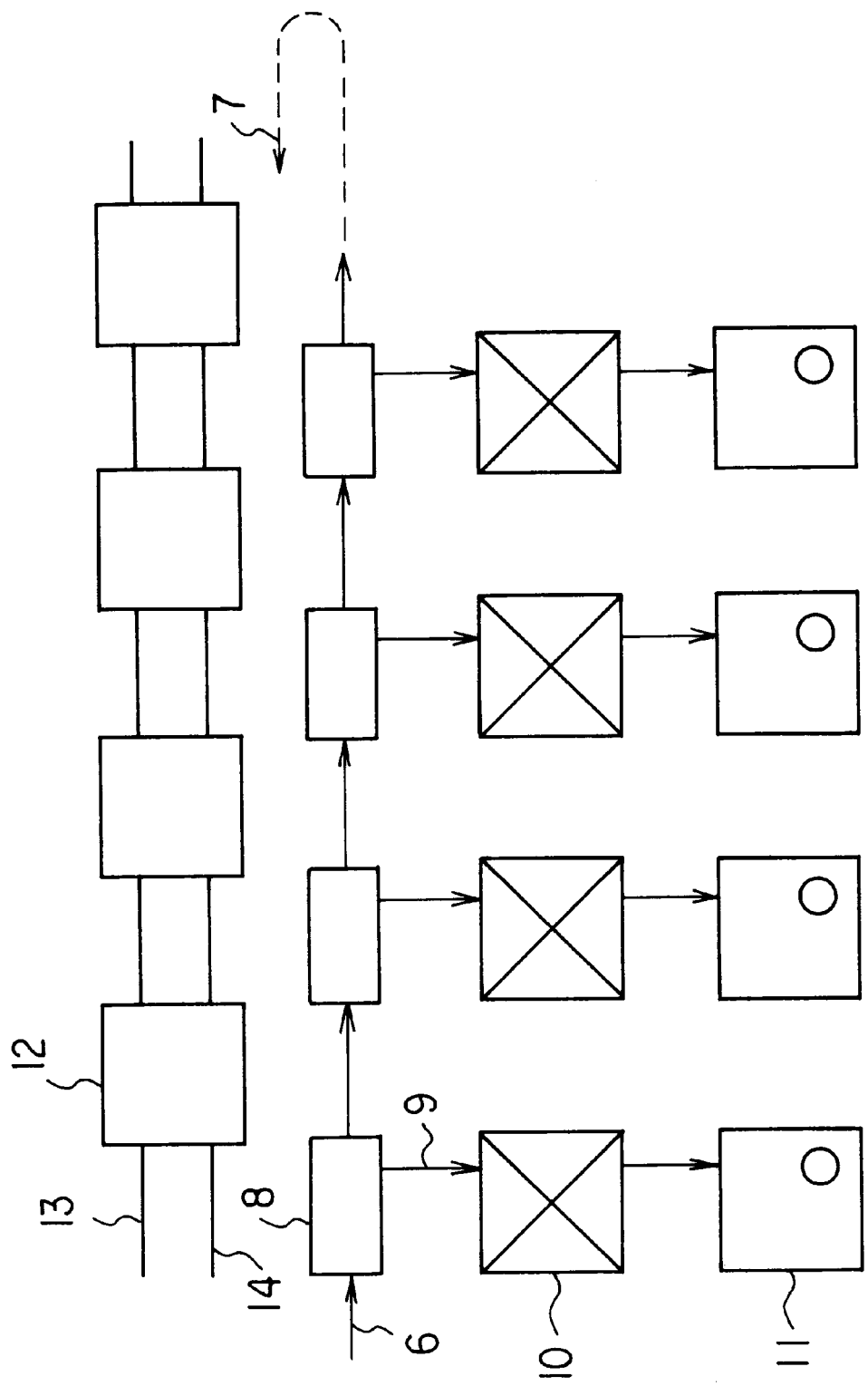
FIG. 2 is a system diagram illustrating the flow of golf balls near a hitting box.
Figure 3:
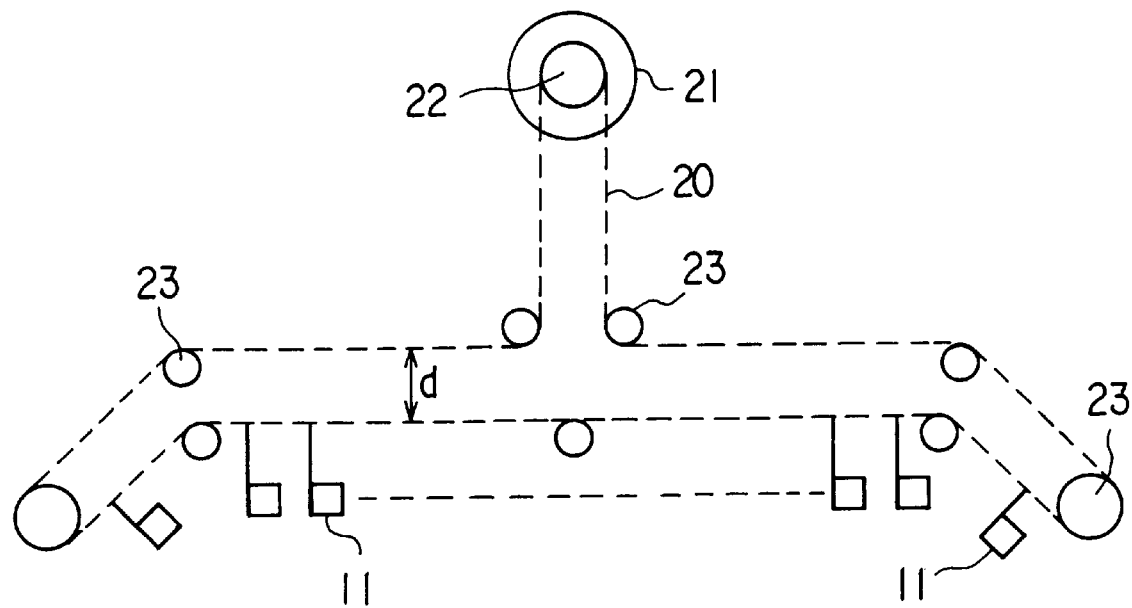
FIG. 3 is a diagram illustrating the total layout of a golf ball conveyor according to an embodiment of the present invention.
Figure 4:
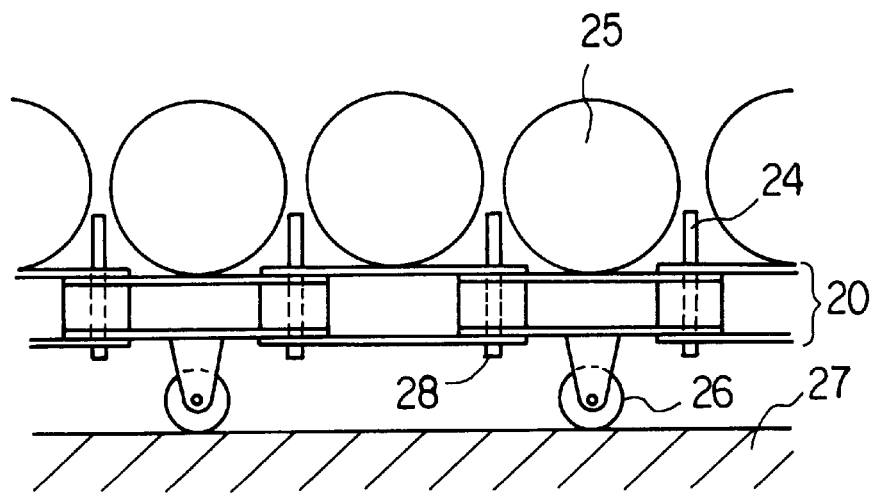
FIG. 4 is a side view of a chain used in the golf ball conveyor.

An embodiment of the present invention will be described with reference to the drawings. FIG. 1 is a system diagram illustrating the flow of collection and delivery of golf balls according to an embodiment of the present invention, FIG. 2 is a system diagram illustrating the flow of golf balls near a hitting box, FIG. 3 is a diagram illustrating the entire layout of a golf ball conveyor, and FIG. 4 is a side view of a chain installed in the golf ball conveyor.

First, the flow of collection and delivery of golf balls will be described with reference to FIG. 1. Golf balls hit in a golf practice range are collected into a ball gathering place 2 by means of a ball collecting system 1, and the golf balls are cleaned out and dried in a plurality of cleansing units 3. The dried golf balls are collected into a ball buffer 4 once, and then sent by means of a plurality of ball delivery units 5 to respective hitting boxes through a ball delivery line 6. Golf balls not used in the hitting boxes are returned to the ball buffer 4 through a return line 7.

Next, the flow of golf balls near the hitting boxes will be described with reference to FIG. 2. As shown in FIG. 2, a number of distributing units 8 are provided at predetermined distances on the way of the ball delivery line 6 extending from the ball delivery units 5, and ball tank units 10 for stocking a predetermined number of golf balls are disposed at the forward ends of branch lines 9 branching from the respective distributing units 8. Golf balls are fed one-by-one to automatic tee-up units 11 from the ball tank units 10 respectively.

Operation disks 12 are disposed at the rear of the respective automatic tee-up units 11 corresponding to the respective automatic tee-up units 11, and the respective operation disks 12 are connected to a central controller (not-shown) through a power line 13 and a data transmission line 14.

Next, a ball conveyor, for example, installed in the ball delivery line 6 or the like, will be described specifically with reference to FIGS. 3 and 4.

As shown in FIG. 3, an endless chain 20 is disposed to go around the hitting boxes (distributing units 8), and this chain 20 is driven so as to rotate in a predetermined direction by means of a driving sprocket 22 coupled with a motor 21. Driven sprockets 23 shown in FIG. 3 are disposed at bent portions or the like of the chain 20, and the distance d between the going and coming lines of the chain 20 is narrow so as to be about 5 to 15 cm. The conveying speed of the chain 20 is set to be about 10 to 30 cm/sec.

As shown in FIG. 4, protrusions 24 for moving balls are provided at predetermined distances over the length of the chain 20 so that golf balls 25 are individually placed between the adjacent ball moving protrusions 24. In this embodiment, link pins 28 of the chain 20 extend upward so as to form the ball moving protrusions 24 respectively.

Lower guide rollers 26 made from synthetic resin are provided under the chain 20 at predetermined distances along the length of the chain 20. The guide rollers 26 roll on a base 27 provided integrally with a bottom wall 32 of a casing 30 which will be described later so as to make the chain 20 move smoothly. Side guide rollers 29 made from synthetic resin are rotatably supported on the link pins 28 respectively (see FIG. 5).

Figure 5:
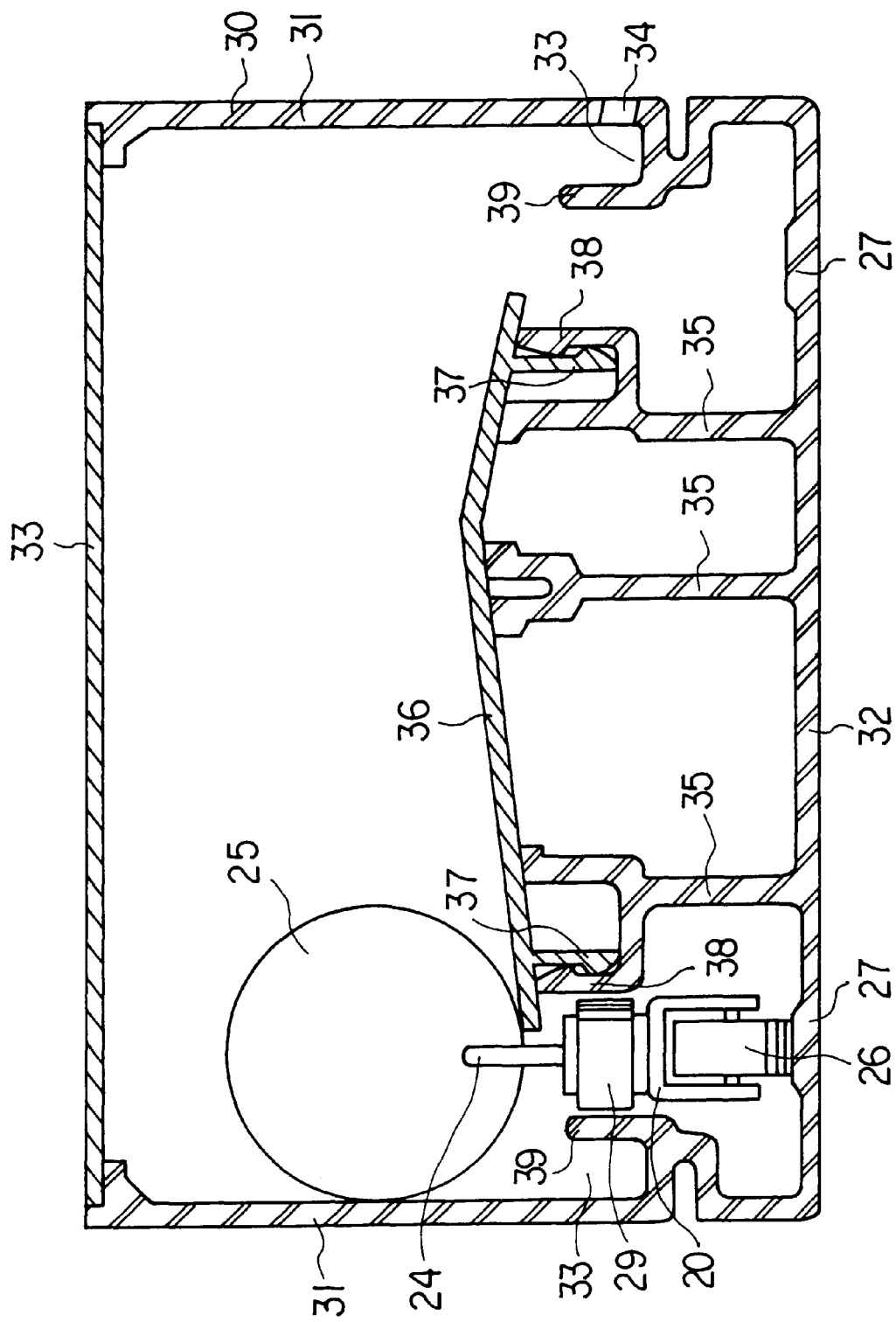
FIG. 5 is an expanded sectional view illustrating a main portion of the golf ball conveyor.

As shown in FIG. 5, the endless chain 20 is received in the casing 30. The casing 30 is defined by opposite side walls 31 and 31 and a bottom wall 32 so that it is opened at its top portion. The opening is closed by a cap 33. Thus, the casing 30 is U-shaped in section, and extends perpendicularly to the paper of the drawing.

Gutter portions 33 for collecting rainwater invading from a gap between the opening portion of the casing 30 and the cap 33 and running down along the inner surfaces of the respective side walls 31 are formed continuously along the longitudinal direction of the casing 30 in the opposite side walls 31 and 31. Drainage holes 34 are opened and disposed in places of the respective side walls 31 opposite the gutter portions 33.

Plural strips of rail supporting walls 35 are erected at the widthwise center of the bottom wall 32, and a rail 36 leaning to the opposite sides and having an almost inverted V-shaped section is mounted on the walls 35. Lock claws 37 are provided on the opposite sides of the lower portion of the rail 36 so as to engage with lock walls 38 which are formed on the outside ones of the rail supporting walls 35 to fix the rail 36 onto the rail supporting walls 35.

The lock walls 38 are opposite inner walls 39 which will be a part of the gutter portions 33, and the side guide rollers 29 of the chain 20 pass between the lock walls 38 and the inner walls 39. Therefore, the lock walls 38 and the inner walls 39 also have a function to prevent the chain 20 from rolling. Although omitted in FIG. 5, another portion of the chain 20 is disposed on the base 27 in the right side in FIG. 5 so that one portion of the chain 20 at the left side forms a going path, and the other portion of the chain 20 forms a coming path.

This golf ball conveyor is buried in a concrete floor of a golf practice range, and a mattress (not-shown) or the like is laid to cover the golf ball conveyor.

Figure 6:
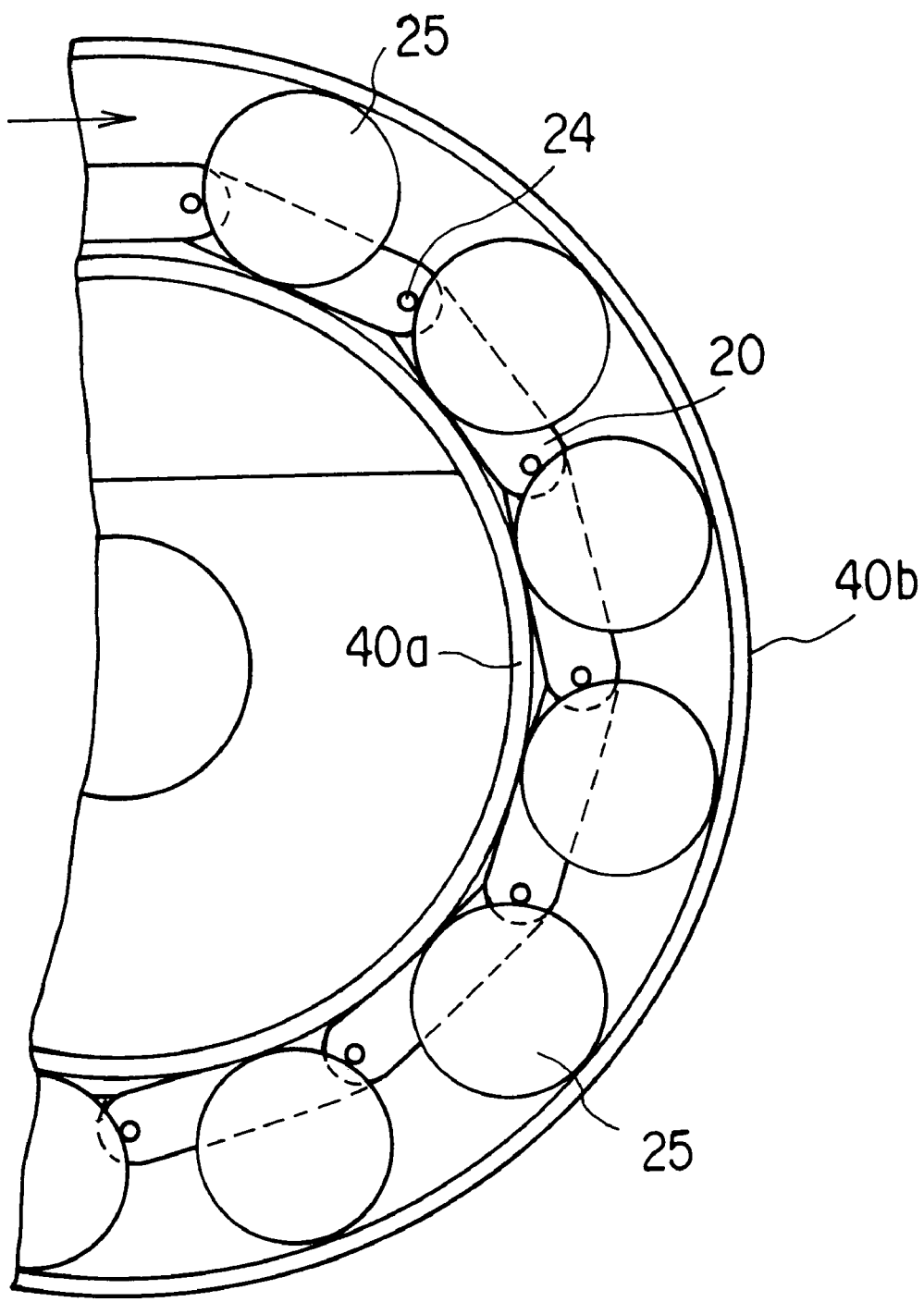
FIG. 6 is a partial cut-away plan view of a U-turn portion of the golf ball conveyor.

FIG. 6 is a plan view of a U-turn portion of the golf ball conveyor. As shown in FIG. 6, inside and outside guide members 40a and 40b formed into a U-turn shape are provided in the U-turn portion, and the driven sprockets 23 (see FIG. 3) are disposed under the guide members 40a and 40b so that the chain 20 is also bent along the guide members 40a and 40b. Therefore, the chain 20 can U-turn in this U-turn portion in the state where the chain 20 is carrying the golf balls 25. Although the case of the U-turn portion is described in FIG. 6, the present invention is also applicable alternatively to another bent portion such as an L-shaped portion, an S-shaped portion or the like.

Figure 7:
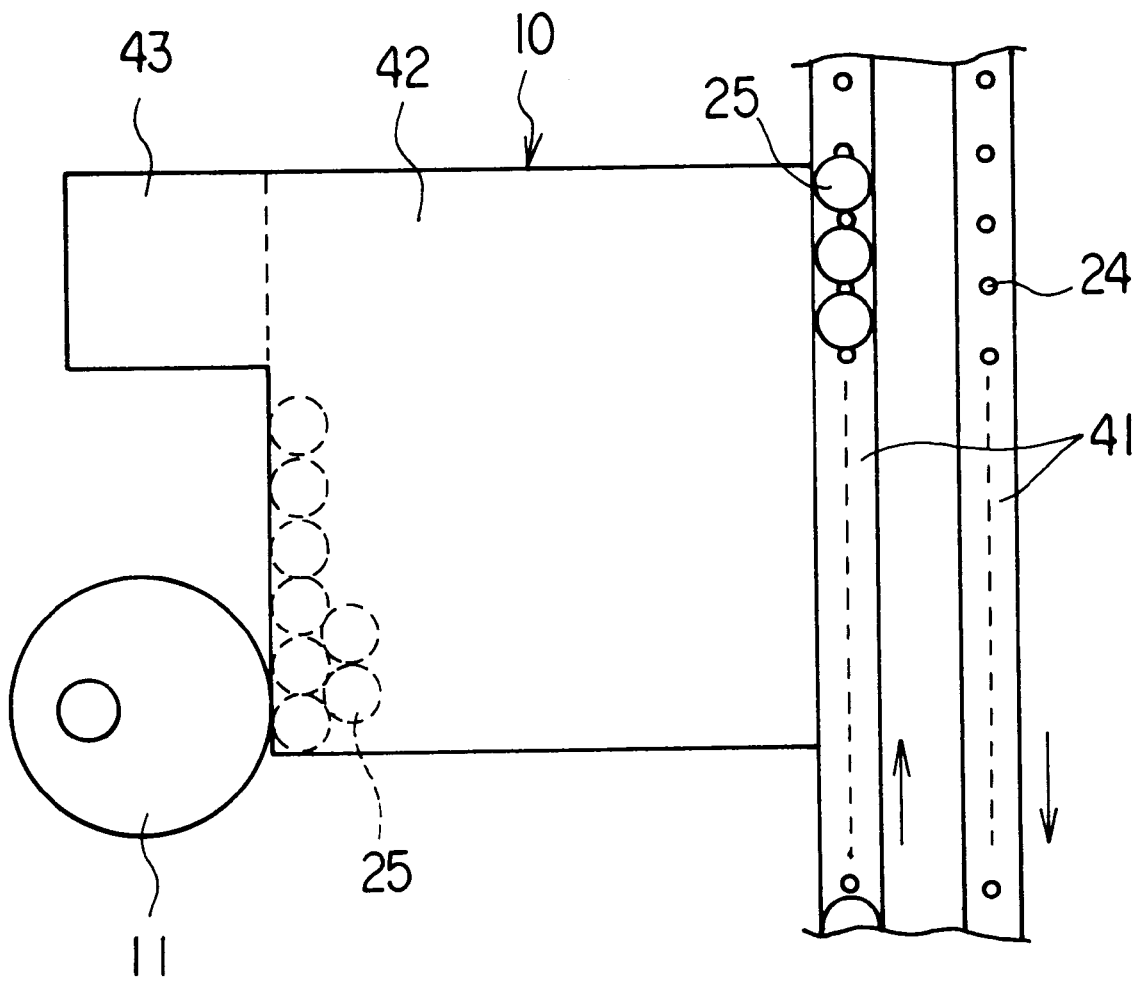
FIG. 7 is a schematic arrangement diagram near a flat ball tank unit according to an embodiment of the present invention.
Figure 8:
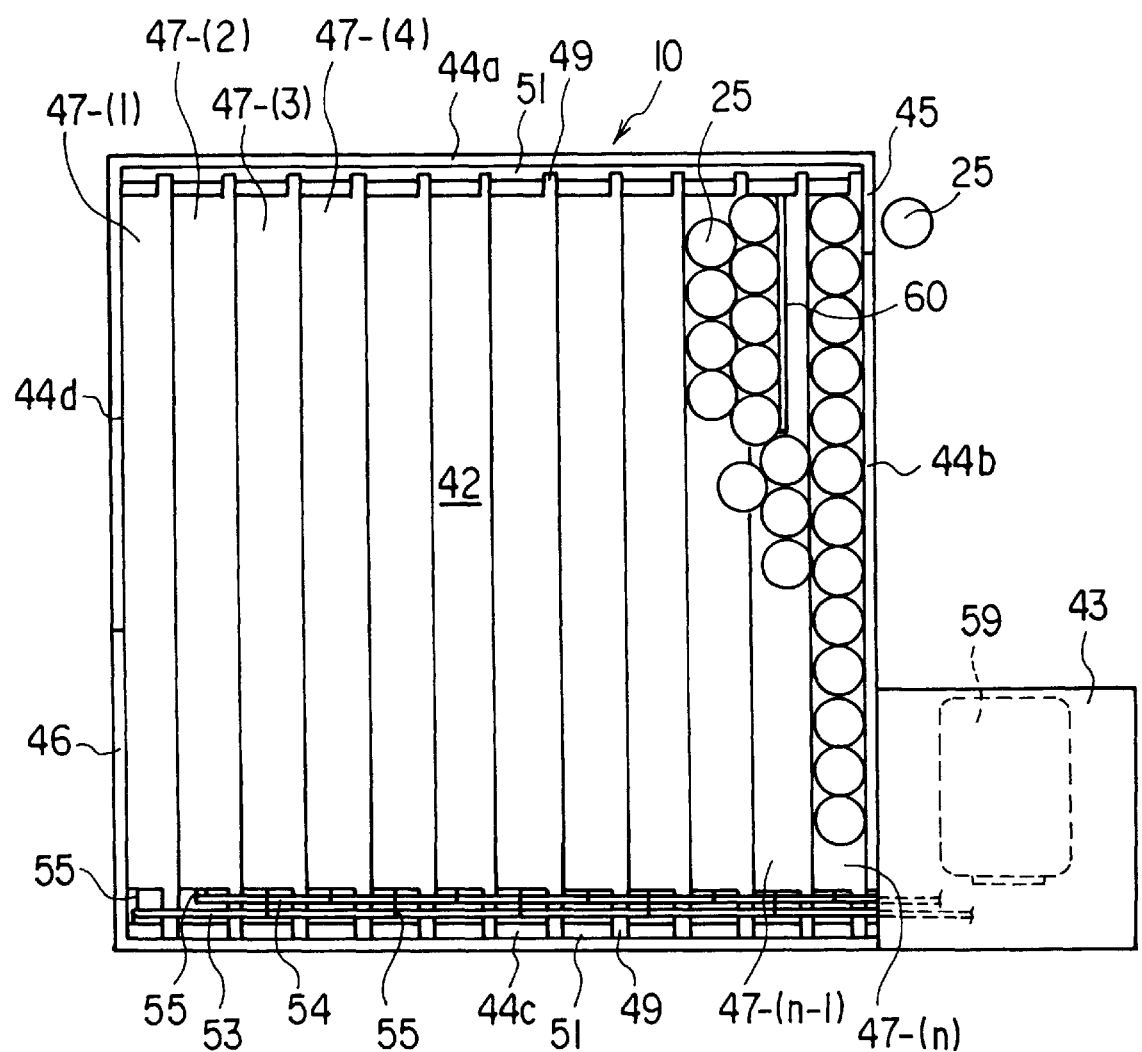
FIG. 8 is a plan view of the flat ball tank unit.

FIG. 7 is a schematic diagram illustrating the arrangement near a flat ball tank unit, and FIG. 8 a plan view of the flat ball tank unit.

As mentioned above, the golf balls 1 collected in the golf practice range are cleaned in the cleaning units, and distributed to flat ball tank units 10 installed in the respective hitting boxes by a golf ball conveyor 41 constituted by the above-mentioned chain conveyor. Each of the flat ball tank units 10 is constituted mainly by a box body 42 for storing and arranging a number of golf balls 25, and a driving portion 43. The golf balls 25 discharged one-by-one out of the flat ball tank unit 10 (box body 42) are supplied to the automatic tee-up unit 11 to hit.

When a cap (not-shown) of the box body 42 is removed, it is seen that side walls 44*a*, 44*b*, 44*c* and 44*d* are erected at the four corners respectively. A ball outlet 45 which is large enough for one golf ball 25 to pass is formed at one end of the side wall 44*b*, and a ball inlet 46 which is large enough for a plurality of golf balls 25 to pass is formed at a portion of the side wall 44*d*. This ball inlet 46 is connected to the golf ball conveyor 41.

Figure 9:
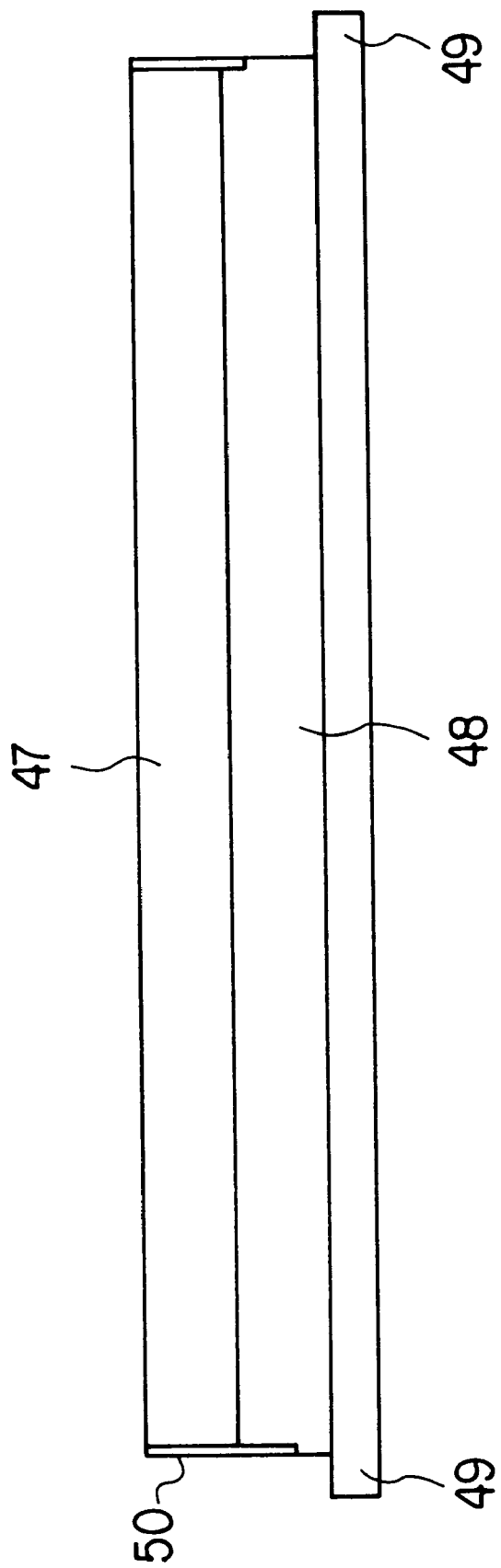
FIG. 9 is a plan view of a ball feed plate used in the flat ball tank unit.
Figure 10:
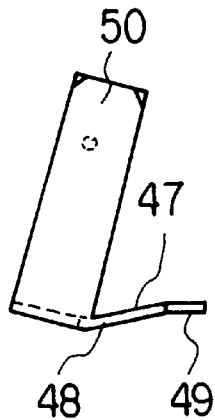
FIG. 10 is a side view of the ball feed plate.
Figure 11:
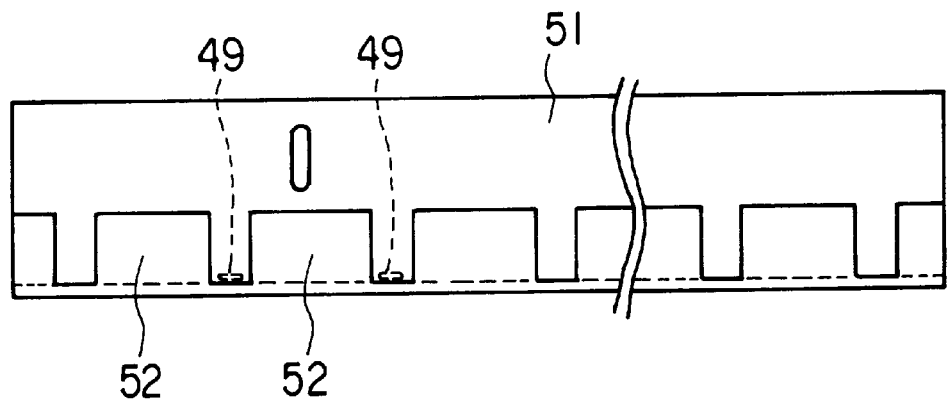
FIG. 11 is a front view of a supporting member used in the flat ball tank unit.

On the bottom of the box body 42, a number of ball feed plates 47 are disposed in parallel with the side wall (outlet side wall) 44*b* where the ball outlet 45 is formed. Each of the ball feed plates 47 is shaped into a long and narrow belt as a whole as shown in FIG. 9, and constituted by a ball feed portion 48 bent so as to be approximately L-shaped as shown in FIG. 10, a shaft portion 49 projecting over the opposite sides of the ball feed portion 48, and a connection portion 50 erected from one end of the ball feed portion 48.

Figure 12:
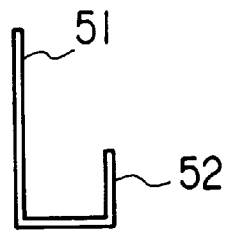
FIG. 12 is a side view of the supporting member.

Inside the side walls 44*a* and 44*c* of the box body 42, supporting members 51 are provided along those side walls. The side surface of each of the supporting members 51 is formed to be approximately L-shaped as shown in FIG. 12. Tooth portions 52 are provided at predetermined distances inside the supporting member 51, and the shaft portion 49 of the ball feed plate 47 is rotatably inserted between the tooth portions 52 and 52 to thereby make positioning of the ball feed plate 47.

Inside one of the supporting members 51, a first driving plate 53 and a second driving plate 54 are provided in parallel with each other, and a number of ball feed plates 47 disposed in the box body 42 are rotatably connected to the first driving plate 53 and the second driving plate 54 alternately through pins 55 respectively. In this embodiment, when the ball feed plates 47 are referenced by 47-(1), 47-(2), 47-(3), 47-(4), . . . 47-(n–1) and 47-(n) in the order from the left in FIG. 8, the odd-numbered ball feed plates 47-(1), 47-(3), ... 47-(n–1) are connected to the first driving plate 53, and the even-numbered ball feed plates 47-(2), 47-(4), . . . 47-(n) are connected to the second driving plate 54.

Figure 13:
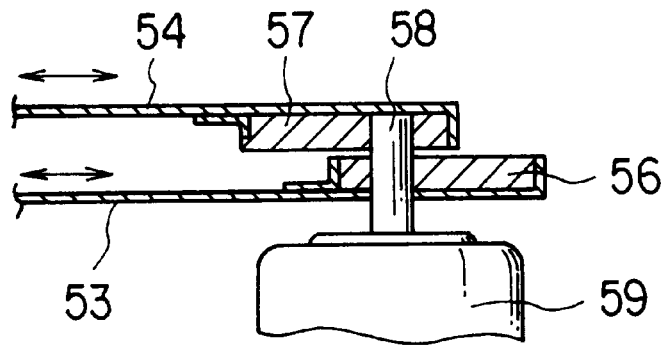
FIG. 13 is a partially sectional view illustrating a coupling structure of respective driving plates and a motor in the flat ball tank unit.

As shown in FIG. 13, a first eccentric cam 56 is rotatably attached to the driving side end of the first driving plate 53, and a second eccentric cam 57 is attached to the driving side end of the second driving plate 54 rotatably. The first and second eccentric cams 56 and 57 are mounted on a motor rotating shaft 58 so that their rotation phases are shifted from each other by 180 degrees, and a motor 59 having this motor rotating shaft 58 is received in the driving portion 43 as shown in FIG. 8.

Figure 14:
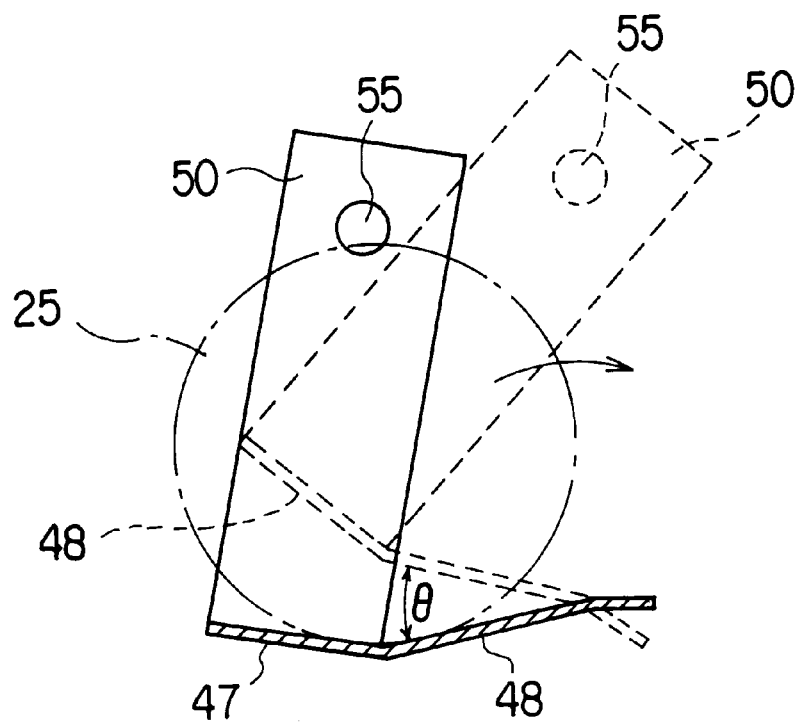
FIG. 14 is a diagram for explaining rotations of a ball feed plate in the flat ball tank unit.

When the motor 43 is driven, the first and second eccentric cams 56 and 57 rotate so that the first driving plate 53 and the second driving plate 54 reciprocate in the state where their phases are shifted from each other by 180 degrees, and the ball feed plates 47 connected to those driving plates 53 and 54 are rotated by a predetermined angle around the shaft portion 49. FIG. 14 shows this state where the ball feed plate 47 repeats rotations between the real line position and the dotted line position. In this embodiment, the rotation angle θ of the ball feed plate 47 is set to fall within a range of from 20 to 30 degrees.

Since the first and second driving plates 53 and 54 reciprocate in the state where their rotation phases are shifted from each other by 180 degrees as mentioned above, for example, when the odd-numbered ball feed plates 47-(l), 47-(3), . . . 47-(n–1) rotate to the positions shown by the dotted line, the even-numbered ball feed plates 47-(2), 47-(4), . . . 47-(n) are in the positions shown by the real line. Therefore, a golf ball 25 mounted on the ball feed plate 47-(1) rotates and moves onto the adjacent ball feed plate 47-(2) by the rotation of the ball feed plate 47-(1). Since the ball feed plates 47 rotate every other plate in such a manner as mentioned above, the golf balls 25 are forced to be sent toward the outlet-side side wall 44*b* sequentially.

The golf balls 25 running against the outlet-side side wall 44*b* are arranged in one line, discharged one-by-one from the ball outlet 45, and fed to the automatic tee-up unit 11 (see FIG. 7).

Near the ball outlet 45, as shown in FIG. 8, a shielding plate 60 is provided in parallel with the outlet-side side wall 44*b* and one ball away from the outlet-side side wall 44*b*. Without this shielding plate 60, a golf ball 25 forced to be sent by the ball feed plate 47 might come between golf balls arranged in one line along the outlet-side side wall 44*b* so as to make it not smooth to supply the golf ball 25 to the ball outlet 45. Therefore, by providing the shielding plate 60 at the above-mentioned position, the golf ball 25 is prevented from entering the line of golf balls, so that the golf ball 25 is discharged more smoothly. It is sufficient that the shielding plate 60 has length corresponding to about three to six balls long.

Figure 15:
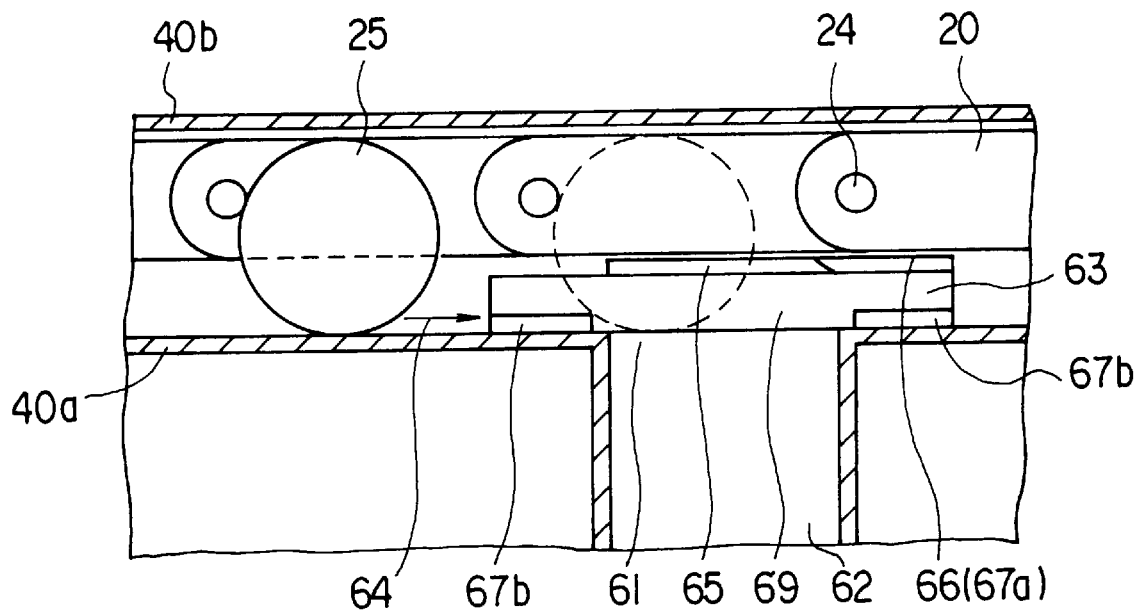
FIG. 15 is a partially sectional plan view for explaining a golf ball distributing unit according to an embodiment of the present invention.
Figure 16:
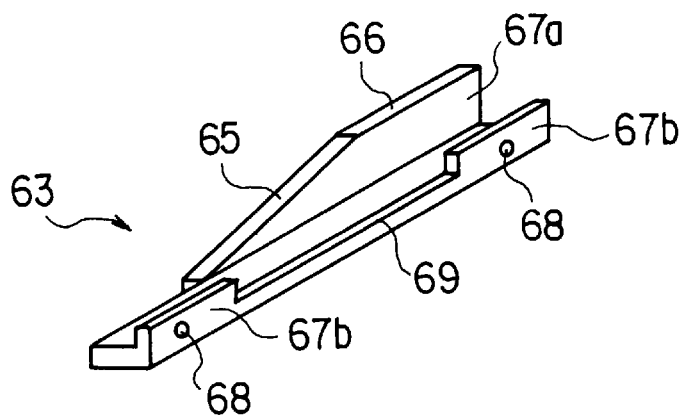
FIG. 16 is a perspective view illustrating a shifting member used in the golf ball distributing unit.

FIGS. 15 and 16 are diagrams for explaining the golf ball distributing units 8. FIG. 15 is a partial sectional plan view illustrating the neighborhood of a distributing port with a shifting member, and FIG. 16 is a perspective view illustrating the shifting member.

The chain 20 is disposed movably in a carriage path constituted by the guide members 40*a* and 40*b* as shown in FIG. 15. Distributing ports 61 are formed at predetermined distances in one of the guide members, that is, in the guide member 40*a*. A distributing path 62 constituting the above-mentioned branching line 9 is provided so as to be connected with each of the distributing ports 61, and connected to the flat ball tank unit 10.

A shifting member 63 shown in FIG. 16 is provided between the chain 20 and the ball distributing port 61. The shifting member 63 has a side wall 67*a* having a slope 65 which is made so as to become gradually higher from the upstream side toward the downstream side in the carrying direction 64 of the golf balls 25 (the direction of arrow), and an upper surface 66 connected to the rear stream side of the slope 65. The slope 65 is further inclined so as to become lower from one guide member 40*b* side toward the other guide member 40*a* side.

Two side walls 67*b* each having a fitting hole 68 are provided on the side opposite to the side wall 67*a*. A recess portion 69 which is substantially equal to or a little larger than the ball distributing port 61 is provided between the upstream side wall 67*b* and the downstream side wall 67*b* in the golf-ball carrying direction (direction of arrow) 64.

As shown in FIG. 15, the shifting member 63 is attached to the guide wall 40*a* so as to make the recess portion 69 opposite to the ball distributing port 61. In the state where the shifting member 63 is attached thereto, the upstream end portion in the golf-ball carrying direction of the slope 65 is even with or a little lower than the ball-mounted surface of the chain 20, and the upper surface 66 of the side wall 67*a* is almost even with or a little higher than the upper surface of the ball moving protrusion 24 of the chain 20.

As shown in FIG. 15, the golf ball 25 placed on the chain 20 and pushed and carried by the ball moving protrusion 24 gets over the slope 65 of the shifting member 63 gradually, and at the same time the golf ball 25 is rotated and shifted slightly toward the distributing port 61 by the effect of the slope 65. In that state, the golf ball 25 is pushed into the distributing port 61 by the pushing force of the protrusion 24, passes over the recess portion 69, turns toward the branching path 62, and is distributed smoothly.

Figure 19:
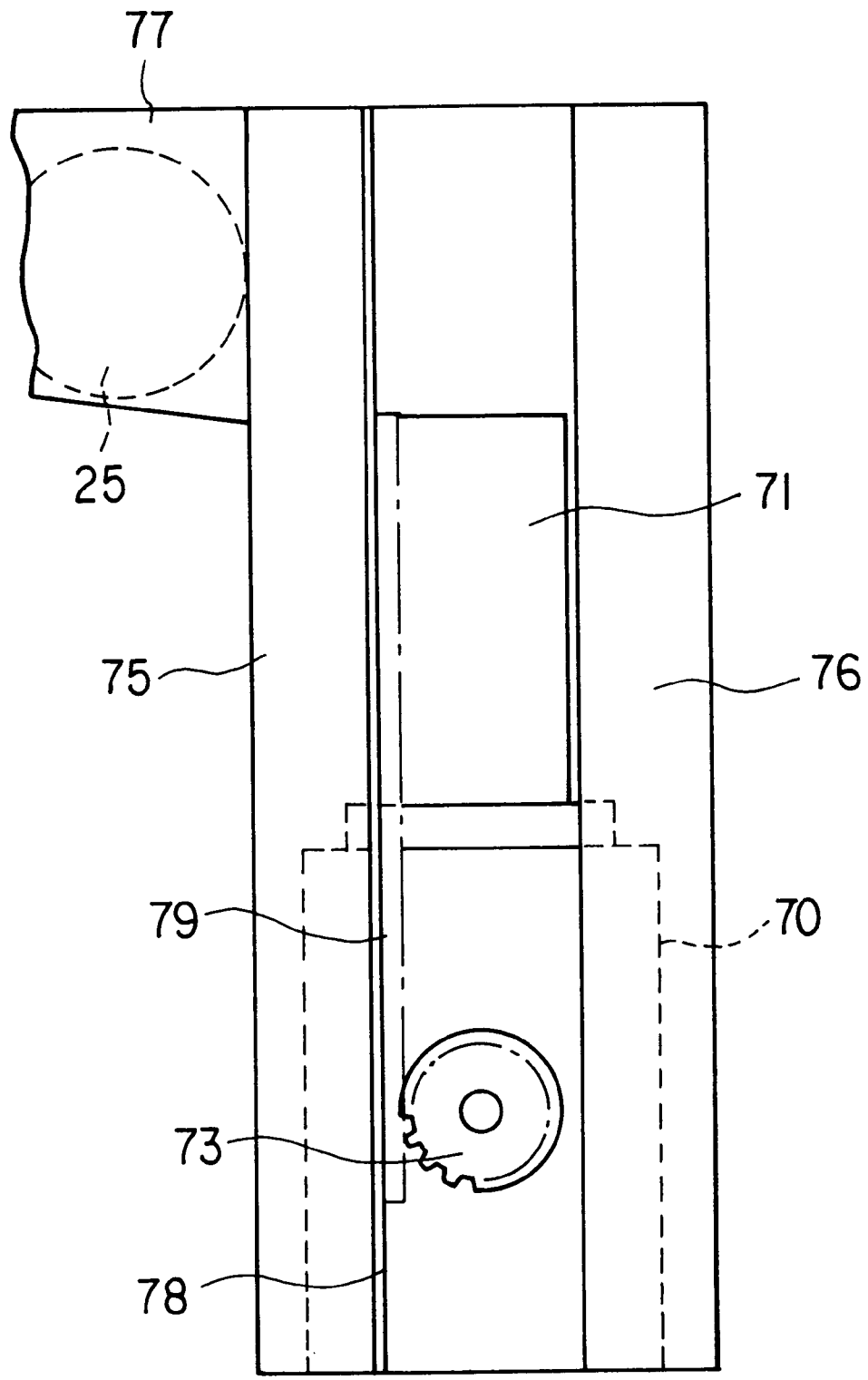
FIG. 19 is a side view of the automatic tee-up unit in which the lift member is in the stand-by position.
Figure 20:
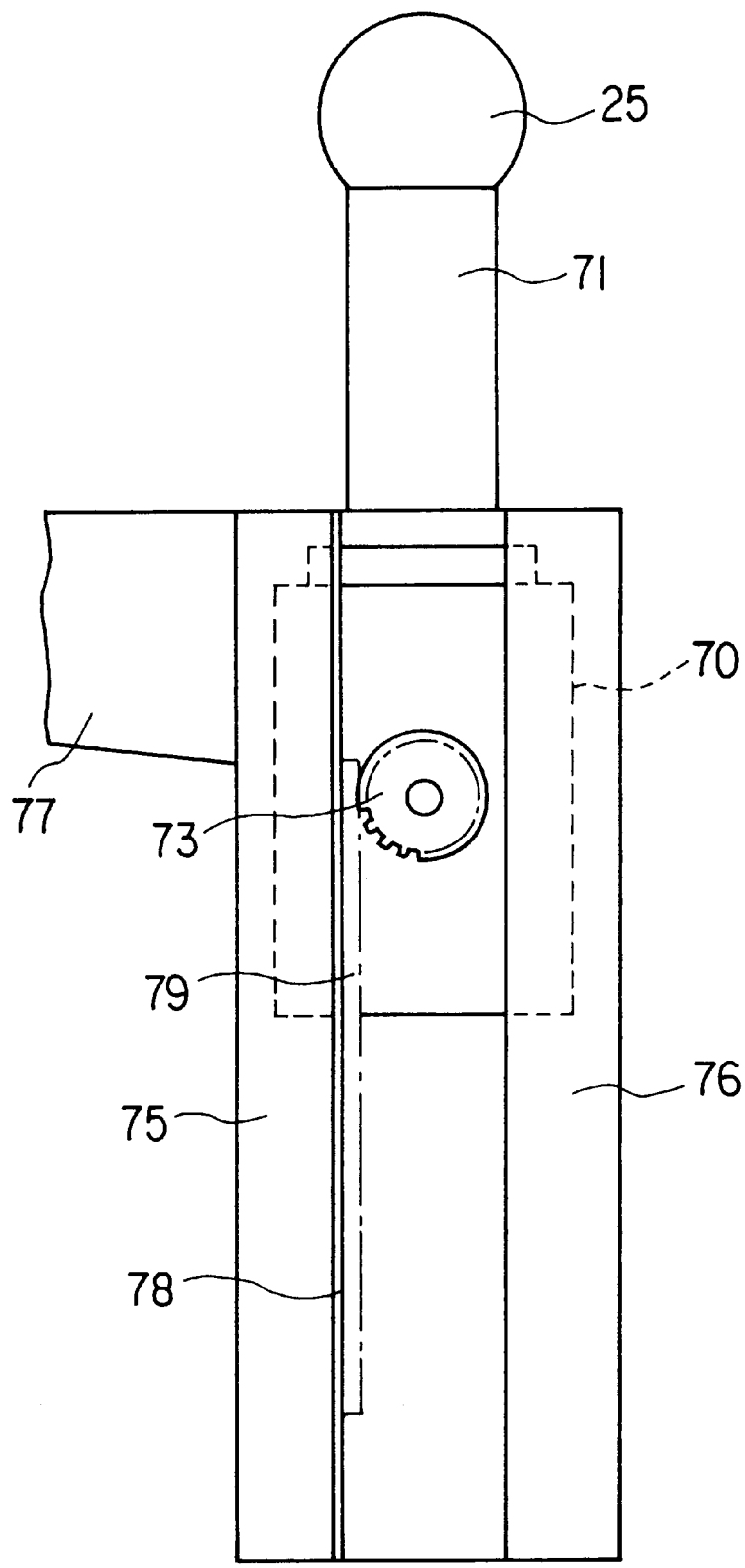
FIG. 20 is a side view of the automatic tee-up unit in which the lift member is in the upper limit position.

FIG. 17 is a side view of a lift member in an automatic tee-up unit, FIG. 18 a top view of the automatic tee-up unit, FIG. 19 a side view of the automatic tee-up unit in which the lift member is in the stand-by position, and FIG. 20 is a side view of the automatic tee-up unit in which the lift member is in the upper limit position.

As shown in FIG. 17, a tee 71 having predetermined height is attached to the upper surface of a box-like lift member 70. A reversible pulse motor 72 is received in the lift member 70, and pinions 73 and 73 made from synthetic resin are mounted on driving shafts on the opposite sides of the pulse motor 72. On the four corners of each of the side surfaces of the lift member 70 where the respective pinions 73 are projecting, guide rollers 74a and 74b made from synthetic resin are attached so as not to interfere with the pinion 73.

As shown in FIG. 18, the lift member 70 is disposed up/down movably in a space formed between a first fixing member 75 constituted by a plate material which is almost crank-shaped in plan view, and a second fixing member 76 constituted by a plate material which is almost U-shaped in plan view. As shown in FIG. 19, a feed duct 77 is connected to the first fixing member 75, and the golf balls 25 are fed one-by-one through the feed duct 77 from the ball tank unit 10.

A rack 79 made from synthetic resin and extending in the up/down moving direction of the tee 71 is fixed to each of flange portions 78 provided on the opposite sides of the first fixing member 75 so that this rack 79 extends straight at least from the stand-by position (see FIG. 19) of the tee 71 to the upper limit position of the tee 71.

As shown in FIG. 18, the lift member 70 is disposed between the first fixing member 75 and the second fixing member 76, so that the pinions 73 of the lift member 70 engage with the racks 79 respectively, and the guide rollers 74a on the front side of the lift member 70 contact with the inner surface of the first fixing member 75 while the guide rollers 74b on the rear side of the lift member 70 contact with the inner surface of the second fixing member 76.

As shown in FIG. 19, in the stand-by state of the tee 71, the lift member 70 is under the fixing members 75 and 76 so that the pinions 73 engage with the lower portions of the racks 79, and the upper end of the tee 71 is near the joint portion (feeding port) of the feed duct 77.

On the basis of a tee-up signal from a controller (not-shown), one golf ball 25 rolls down onto the tee 71 through the feed duct 77 from the ball tank unit 10. When it is detected that the golf ball 25 has been put on the tee 71 by a first sensor (not-shown) such as an ultrasonic sensor, a photosensor or the like, the pulse motor 72 is turned forward on the basis of this detection signal. The pinions 73 are caused to rotate when this pulse motor 72 is driven so that the lift member 70 is moved up along the racks 79. With the movement of the lift member 70, the guide rollers 74a and 74b roll on the inner surfaces of the fixing members 75 and 76 so as to make the movement of the lift member 70 smooth.

Pulse signals supplied to the pulse motor 72 are counted by a counter (not-shown) such that when the counted number of the pulse signals reaches a predetermined number, the tee 71 reaches its upper limit (see FIG. 20), and the driving of the pulse motor 72 is stopped.

When it is detected that the golf ball 25 on the tee 71 has been hit out by a second sensor (not-shown) such as an ultrasonic sensor, a photosensor or the like, the pulse motor 72 is reversed on the basis of this detection signal. The pinions 73 are also reversed by this driving of the pulse motor 72 so that the lift member 70 is moved down to the position shown in FIG. 19 along the racks 79.

According to the first aspect of the present invention, as described above, a chain is used so that the golf ball conveyer can be made thinner than a belt conveyor, and a concrete floor can be therefore made thin particularly on a second or higher floor.

In addition, with use of a sprocket, the chain can be bent and curved freely so that allowance can be provided in design, and golf balls can be conveyed only on one chain even if the ball conveying line is bent and curved. Thus, the golf balls can be conveyed surely, and the reliability can be improved.

Further, because ball-moving protrusions are separated from the chain, lubricating oil can be fed to the chain so that a golf ball conveyor having a long service life can be provided.

According to the second aspect of the present invention, a drain gutter is provided on the inner surface of each of the side walls of a casing, so that there is no fear that rainwater is collected in the casing to thereby prevent the chain from getting rusty. As a result, golf balls can be conveyed always smoothly by the chain without generation of any noises to keep silence to prolong the life of the golf ball conveyor.

What is claimed is:

1. A golf ball conveyor comprising:

an endless chain having link pins arranged vertically which moves along a travelling line in a golf-ball conveying direction to convey golf balls;

chain-driving means having a vertical rotational axis for driving said chain to rotate in an endless manner;

a plurality of ball moving protrusions provided at predetermined distances on said chain to move said golf balls one-by-one; and a plurality of guide rollers provided at predetermined distances on said chain for guiding movement of said chain.

2. A golf ball conveyor according to claim 1, further comprising sprockets having vertical rotational axes for bending said travelling line of said endless chain.

3. A golf ball conveyor according to claim 1, wherein said plurality of ball moving protrusions consist of extensions of said link pins.

4. A golf ball conveyor according to claim 1, wherein said guide rollers include a plurality of lower guide rollers provided on lower portions of said chain so as to roll while supporting said chain, on a base on which said golf ball conveyer is mounted, and a plurality of side guide rollers provided on said link pins used as rotational axes so as to roll between side walls erected on said base.

5. A golf ball conveyor comprising:

a casing having two side walls, a bottom wall, and a cap which removably closes a top opening of said casing, said casing extending along a travelling line in a golf-ball conveying direction;

an endless chain having link pins arranged vertically, said chain movably disposed in said casing for conveying golf balls, said chain having rollers rotatably provided at predetermined distances on said chain to guide said chain and protrusions provided at predetermined distances on said chain to move said golf balls one-by-one; and gutters provided on inner surfaces of said side walls respectively, for collecting rainwater running down along said inner surfaces of said side walls of said casing, and draining said rainwater outside said casing.

6. A golf ball conveyor according to claim 5, further comprising sprockets having vertical rotational axes for bending said travelling line of said endless chain.

7. A golf ball conveyor according to claim 5, wherein said guide rollers include a plurality of lower guide rollers provided on lower portions of said chain so as to roll while supporting said chain, on a base of said bottom wall, and a plurality of side guide rollers provided on said link pins used as rotational axes so as to roll between additional side wall portions erected from said bottom wall.

8. A gold ball conveyor according to claim 5, wherein said plurality of ball moving protrusions consist of extensions of said link pins.

* * * * *